May 18, 1965  J. K. BROWN  3,184,355
METHOD OF MAKING A PRINTER'S ROLLER
Filed April 15, 1963
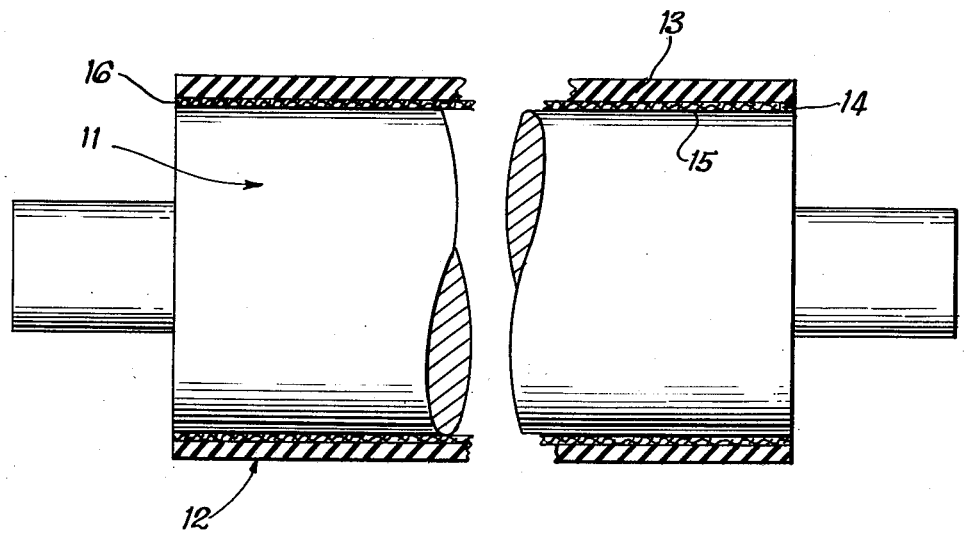
INVENTOR.
James K. Brown
BY Horton, Davis,
Brewer & Brugman
Att'ys

3,184,355
METHOD OF MAKING A PRINTER'S ROLLER

James K. Brown, Arlington Heights, Ill., assignor to Sam'l Bingham's Son Mfg. Co., Chicago, Ill., a corporation of Delaware
Filed Apr. 15, 1963, Ser. No. 272,903
2 Claims. (Cl. 156—154)

This invention relates in general to a method of making a preformed covering and mounting it on a cylindrical metal core to form a printer's roller.

In the manufacture, use and repair of printer's rollers, a considerable part of the costs comes from the expense and time required for transporting the rollers between manufacturing or repair centers and use locations.

A principal object of the invention, therefore, is to reduce the cost to the user of maintaining a printer's roller at maximum operating efficiency.

This is accomplished by providing a novel roller having a metal core and a preformed outer covering, comprising a tubular sleeve of extruded rubber vulcanized to a sleeve lining of stretched knitted cotton fabric, which may be mounted on the core without requiring any complex equipment by merely saturating the lining with an epoxy-based, polyurethane, or other suitable metal-fabric adhesive, slipping the outer covering onto the core, and allowing the adhesive to set by drying to effect uniform attachment of the covering over the entire peripheral surface area of the core.

Thus, while having the advantage of facilitating repair and maintaining of the roller at maximum operating efficiency at a location remote from the place of manufacture, with the consequent material savings of the time and cost of shipping the metal core back to the place of manufacture that otherwise would be required, the present invention also provides a greatly improved roller by virtue of the outer rubber sleeve being completely homogeneous, free of seams, air bubbles, and voids, and firmly secured to the core throughout its entire peripheral surface.

Numerous other objects and advantages of the invention will be apparent as it is better understood from the following description, which, when taken in connection with the accompanying drawing, discloses a preferred embodiment thereof.

The single drawing is a longitudinal sectional view of a printer's roller embodying the features of this invention.

Referring more particularly to the drawing, reference numeral 11 designates a cylindrical metal core of any suitable dimensions, on the peripheral surface of which is mounted a preformed outer covering identified generally by reference numeral 12.

The preferred method of making the outer covering 12, which forms a part of this invention, comprises extruding a rubber tube or sleeve 13 on an ordinary rubber extruder, stretching a suitable length of tubular knitted cotton fabric on a steel mandrel dimensioned substantially the same as the core 11 to provide a sleeve lining 14, coating the stretched sleeve lining 14 with a layer of synthetic rubber cement, slipping the extruded sleeve 13 over the coated fabric lining 14 on the mandrel, wrapping the whole in the conventional manner and vulcanizing the same, as in a steam autoclave, and removing the vulcanized fabric-lined outer covering 12 from the mandrel.

The outer covering 12 may be used immediately, or it may be stored or shipped for future use at any desired point. If it is to be used as a replacement for an old covering on a metal core, the old covering must first be removed in the conventional manner and the core cleaned, preferably with sandpaper.

All that is required in order to mount the preformed outer covering 12 on the core 11 is to mix up a sufficient quantity of a two-part epoxy-based, polyurethane, or other suitable metal-fabric adhesive, thoroughly saturate the inner fabric lining 14 with it, slip the covering 12 over the core 11 while the adhesive is still wet, and allow the roller to stand overnight for curing or setting of the adhesive to form an effective bond 15 between the core 11 and the outer covering 12. The vulcanized rubber covering thus is firmly secured to the metal core throughout the entire peripheral surface of the latter, so that it cannot thereafter creep or be distorted or displaced in any manner relative to the metal core. With simple equipment, the resulting roller may be finish ground and polished in conventional manner, and the end portions of the outer covering 12 may readily be trimmed to conform to the end surfaces of the main part of the metal core 11, as indicated at 16 in the drawing.

One example of a suitable two-part adhesive, the two parts of which are mixed in substantially equal quantities in well-known manner, is as follows, with the specific quantities of the individual constituents indicated as parts by weight:

Part A—
| | |
|---|---|
| Liquid diepoxide resin | 3000 |
| Methyl ethyl ketone | 250 |
| Toluol | 250 |
| | 3500 |

Part B—
| | |
|---|---|
| Amine terminated polyamide | 2500 |
| Tetra ethylene pentamine | 150 |
| Tertiary amine catalyst | 60 |
| Toluol | 400 |
| Methyl ethyl ketone | 400 |
| | 3510 |

It is thought that the invention and many of its attendant advantages will be understood from the foregoing description, and it will be apparent that various changes may be made in the form, construction and arrangement of the parts and in the steps of the method without departing from the spirit and scope of the invention or sacrificing all of its material advantages, the form and method hereinbefore described being merely preferred embodiments thereof.

I claim:

1. The method of making a printer's roller, comprising extruding rubber to form a tubular sleeve, stretching a tubular sleeve lining of knitted cotton fabric onto a steel mandrel, coating said sleeve lining with synthetic rubber cement, placing said rubber sleeve over said sleeve lining, vulcanizing said rubber sleeve to provide a preformed outer covering and removing the same from said mandrel, saturating said sleeve lining with an adhesive, slipping said outer covering over a metal core and allowing said adhesive to set by driving, and finish grinding and polishing the outer peripheral surface of said covering.

2. The method of making a printer's roller, comprising preforming an outer covering by vulcanizing an extruded rubber sleeve upon a knitted tubular cotton fabric sleeve lining stretched onto a mandrel, saturating the sleeve lining of said preformed covering with an adhesive, slipping said covering over a metal core and allowing said adhesive to set by drying, finish grinding and polishing the outer peripheral surface of said covering, and trimming the ends of said covering to conform to the length of said core.

(References on following page)

References Cited by the Examiner

UNITED STATES PATENTS 192,315 6/77 Whittemore _____ 29—131
2,278,424 4/42 Campbell _____ 29—131
2,778,093 1/57 Mack _____ 29—131 X

FOREIGN PATENTS 309,746 4/29 Great Britain.

WALTER A. SCHEEL, *Primary Examiner.*
J. D. BEIN, *Examiner.*

UNITED STATES PATENT OFFICE
CERTIFICATE OF CORRECTION

Patent No. 3,184,355 May 18, 19

James K. Brown

It is hereby certified that error appears in the above numbered patent requiring correction and that the said Letters Patent should read as corrected below.

Column 1, line 57, strike out "a", second occurrence; col 2, line 59, for "driving" read -- drying --.

Signed and sealed this 19th day of October 1965.

(SEAL)
Attest:

ERNEST W. SWIDER
Attesting Officer

EDWARD J. BRENNER
Commissioner of Patents